July 21, 1936. G. G. MORENO 2,048,194

INTERMITTENT MOVEMENT

Filed Dec. 11, 1934

Inventor
Gabriel Garcia Moreno

By Lyon+Lyon
Attorneys

Patented July 21, 1936

2,048,194

UNITED STATES PATENT OFFICE 2,048,194

INTERMITTENT MOVEMENT

Gabriel García Moreno, Los Angeles, Calif., assignor to C M C Corporation, New York, N. Y., a corporation of Delaware Application December 11, 1934, Serial No. 756,953

10 Claims. (Cl. 74—125.5)

This invention relates to improvements in devices for intermittently advancing strip material, and particularly strip motion picture film. Ordinarily, the intermittent advance of film or the partial and intermittent rotation of sprockets and the like is accomplished by means of a Maltese cross provided with radially extending slots adapted to engage with a pin carried by a continuously driven cam. It has been found that the Maltese cross, although useful for the intermittent longitudinal advance of normal motion picture film a distance of one frame length at a time, is not adapted for the longitudinal advance of the film a greater length, such as two or three frame lengths.

Furthermore, a relatively large portion of a total cycle is consumed in advancing the film, thereby reducing the length of time available for projection or printing purposes. Moreover, there is a tendency for the ends of the crosses to break off, for the pins to crystallize, and at all events considerable amount of slap, backlash and wear take place on the sides of the radial grooves, thereby impairing the accuracy of the movement.

A form of apparatus adapted to produce intermittent movement of film has been disclosed in a co-pending application Serial No. 726,884. Said application is particularly directed toward an intermittent movement adapted to longitudinally advance strip film a distance equivalent to two frame lengths within the same period of time consumed normally in advancing film a distance of one frame length. The intermittent advance of film a distance of two frame lengths or more is desired in certain processes of color cinematography in which two, three, or more frames are projected either simultaneously or in rapid succession.

The present invention relates to a form of intermittent movement which may be readily introduced into existing types of projectors, printers and the like and which enables the operator, by a trivial and simple adjustment, to advance the film intermittently either in the normal manner (one frame length at a time) or any multiple thereof, as for example, two frame lengths or even three frame lengths at a time.

Moreover, the present invention relates to an intermittent movement which does not utilize the Maltese cross and which is free from the objections hereinabove referred to. Furthermore, the device of this invention is capable of advancing film more rapidly, that is, during a shorter proportion of the total cycle, thereby increasing the length of time available for projection, printing, or the like. In addition, the device of this invention insures positive registrations or positioning of the film with respect to the aperture, film gate and/or optical axis, thereby obviating the necessity of separate or independent means for registering the images.

An object of this invention, therefore, is to disclose and provide a device for intermittently advancing film.

Another object is to disclose and provide a device whereby film may be selectively intermittently moved various increments of length.

A still further object is to disclose and provide a device for intermittently moving strip film whereby backlash is prevented and the images or film are automatically properly positioned and/or registered with respect to the optical axis of the apparatus in which the device is used.

These and other objects, uses and advantages of the invention will become apparent to those skilled in the art from the following detailed description of one illustrative embodiment of the invention. In thus illustrating the invention, reference will be had to the appended drawing, in which.

Figure 1:
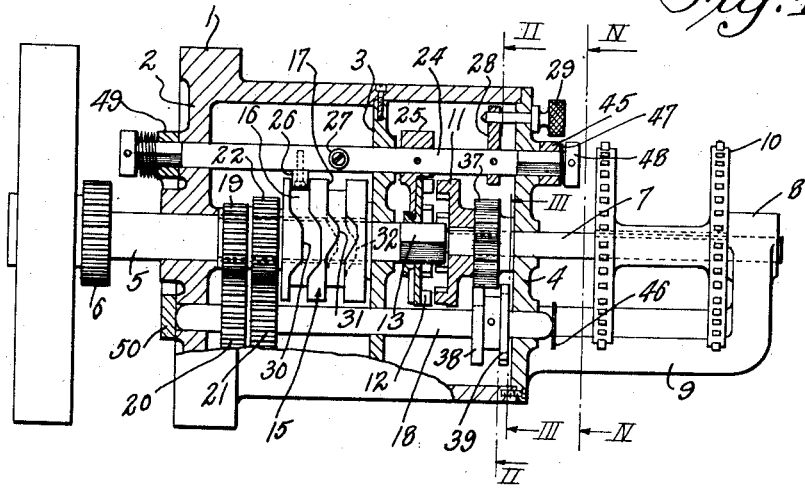
Fig. 1 is a side elevation, partly broken away.
Figure 3:
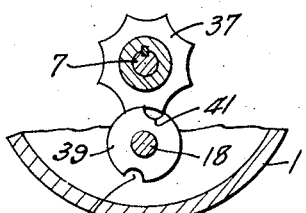
Fig. 3 is a transverse section taken along the plane III—III of Fig. 1.
Figure 2:
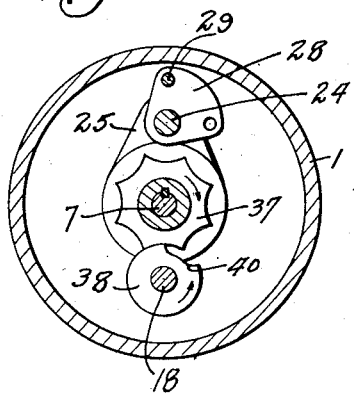
Fig. 2 is a transverse section taken along the plane II—II of Fig. 1.
Figure 4:
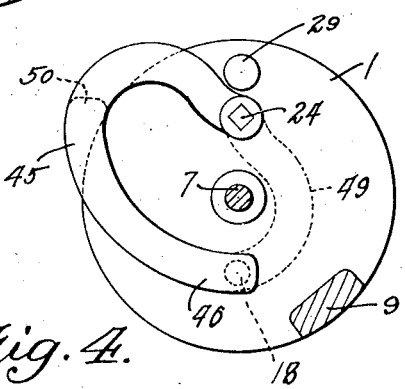
Fig. 4 is a transverse section taken along the plane IV—IV of Fig. 1.

As shown in Fig. 1, the device itself may include a cylindrical housing 1 adapted to be suitably attached to the case or frame of any desired piece of apparatus, such as a projector, printer, or the like (not shown). When used in a projector, the device is preferably attached thereto at a point slightly below the film gate. The housing may be provided with an end plate 2, a transverse partition 3 and a cover plate 4. Journaled within the housing is a drive shaft 5 terminating in the space between the partition 3 and the cover 4. The shaft 5 may be provided with a fly wheel and means for driving the same, such as the gear 6, said gear being driven in the normal manner from the ordinary projector-operating or printer-operating mechanism.

In substantial alignment with the drive shaft 5 is a driven shaft 7, said shaft being journaled in the cover plate 4 and in a bearing 8 carried by an arm 9 extending from the cover plate 4. A suitable sprocket 10 is mounted on the driven shaft 7 and a portion of a clutch or clutch member 11 is mounted on the inner end of said driven shaft. A complementary clutch member 12 may be slidably mounted upon a squared or splined end portion 13 of the drive shaft 5.

The device includes a cylindrical cam 15 provided with one or more circumferential cam grooves, such as the grooves 16 and 17. Said cylindrical cam 15 may be mounted for rotation along its axis at any suitable point within the housing but is preferably journaled upon the drive shaft 5, as shown. Means are provided for driving said cylindrical cam 15 and such means may include a countershaft 18 and reduction gearing. Said reduction gearing may include a gear 19 mounted upon the drive shaft 5, gears 20 and 21 mounted upon the countershaft 18, and a gear 22 journaled on the drive shaft 5 and attached to the cylindrical cam 15.

Means for actuating the clutch (11—12) by means of the cylindrical cam 15 are provided. Such means may include a clutch rod 24, longitudinally slidable in the end plate, cover plate and partition of the housing. Such clutch rod may carry an arm 25 provided with a yoke which is engageable with a groove formed in the clutch portion 12, the clutch portion 12 being longitudinally movable with said arm. The clutch rod 24 is also provided with dogs extending radially from the clutch rod, said dogs being angularly displaced with respect to one another. As indicated in the drawing, the clutch rod 24 is provided with two dogs in the form of rollers 26 and 27, said rollers being positioned at 90° to one another so that partial rotation of the clutch rod 24 will permit either dog 26 to enter the groove 16 or the dog 27 to enter the groove 17 of the cam 15. Means for locking the clutch rod in an angular position with one of said dogs or rollers in engagement with a groove are also provided. Such means may include a segment 28 mounted on the rod 24, said segment being provided with two apertures displaced 90° from one another. The cover plate 4 may then be provided with a locking pin 29 adapted to extend through either one of the two apertures formed in the segment 28, said locking pin 29 being parallel to the axis of the clutch rod 24.

In the device described hereinabove, a two to one reduction gearing is illustrated. The groove 16 of the cylindrical cam 15 is provided with but a single raised cam portion 30 whereas the groove 17 is provided with two diametrically opposed raised portions 31 and 32. It is evident that when the drive shaft 5 is continuously driven, the countershaft 18 and the cylindrical cam 15 will be driven at one-half speed and that when the roller 27 is in engagement with the groove 17, the clutch will be engaged and disengaged once during every revolution of the drive shaft 5. The raised portiton 31 of the cam groove 17 is sufficiently wide so that when the sprocket 10 carries thirty-two teeth, the clutch portions 11 and 12 will be in engagement for only one eighth of a revolution of the driven shaft 7, thereby advancing any film in engagement with the sprocket 10 a longitudinal increment equivalent to four sprocket holes. In the event the roller 26 is in engagement with the cam groove 16, then two complete revolutions of the drive shaft 5 will cause the clutch members 11 and 12 to be in engagement for a sufficient length of time to longitudinally advance the film a distance of eight sprocket holes (one-fourth revolution of the driven shaft 7).

Attention is called to the fact that in normal projection and printing cinematographic machines, the intermittently driven sprockets are usually provided with but sixteen teeth. By increasing the size of the sprocket as above described, the peripheral speed is increased so that the time consumed in actually advancing the film is reduced, thereby permitting a longer projection period with respect to the time spent in moving the film. By doubling the peripheral length (or pitch circumference) of the sprocket 10, it is possible to advance a film a distance of two frames (eight sprocket holes) instead of the normal one frame in the same period of time. Obviously, the arrangement of cam grooves on the cylindrical cam 15, the extent of the reduction gearing or the speed at which such cylindrical cam is driven, and the size of the sprocket 10 may be varied so that any desired length of film may be advanced at a time. Preferably, however, the cylindrical cam 15 is always driven at a fractional speed of the drive shaft.

Means are also provided in the device for automatically holding the driven shaft 7 in position at the completion of each and every period of partial rotation or film advance, such means thus preventing backlash or spinning and permitting the sprocket 10 to act as a registering device, insuring perfect positioning of the images carried by the film with respect to the aperture, film gate, or optical axis of the apparatus in which said device is installed.

Such means may include an eight point star wheel 37 mounted upon the driven shaft 7 and locating cams 38 and 39 mounted upon the countershaft 18. The two locating cams 38 and 39 are spaced from each other a distance sufficient to cause only one of said cams to be in operative engagement with the star wheel 37 at a time, the other of said cams being engageable with the star wheel upon longitudinal movement of the countershaft 18. Spacing of the cams, however, is not sufficient to cause disengagement of the gear train 19, 20, 21, 22, upon longitudinal shifting of the countershaft 18 an amount sufficient to bring the other cam into engagement with the star wheel. The cam 38 is provided with a single cut-out portion 40 of sufficient size to permit two of the points of the star wheel 37 to pass. The cam 38 should therefore be in operative engagement with the star wheel 37 when the roller 26 of the clutch rod 24 is in operative engagement with the groove 16 of the cylindrical cam 15. By permitting two points of the star wheel 37 to pass, the sprocket 10 is permitted to rotate one-fourth of a revolution, thereby advancing the film a distance of eight sprocket holes before further rotation of the sprocket 10 is positively driven by the locating cam 38.

The locating cam 39, on the other hand, is provided with two narrow openings 41, these openings being sufficient to receive but a single point of the star wheel 37, thereby limiting the partial rotation of the driven shaft 7 and the sprocket 10 to but one-eighth of a revolution, thereby advancing the film longitudinally a distance of but four sprocket holes. When the locating cam 39 is in operative engagement with the star wheel 37, the roller 27 should be in operative engagement with the cam groove 17.

The ends of the clutch rod 24 may be squared. The rear end of the clutch rod 24 may carry an arcuate arm 45 provided with a beveled or wedge-shaped end 46, said wedge riding upon and forcing the end of countershaft 18 toward the right when the clutch rod 24 is in the position shown in the drawing. A spring 47 may be carried between the member 45 and a nut 48 rigidly mounted on the end of the clutch rod 24.

The front portion of the clutch rod 24 is provided with a similar squared portion and an arm 49 curved in the opposite direction, said arm being also provided with a wedge-shaped end portion 50. When the clutch rod 24 is partially rotated so as to remove roller 26 from the groove 16 and insert the roller 27 in the groove 17, the arcuate member 45 is withdrawn from contact with the end of countershaft 18 and the clutch 50 then rises over the rounded end of countershaft 18 and forces said shaft toward the left. In this manner the locating cam 39 is automatically moved into operating engagement with the star wheel 37 whenever a change is made in the intermittent movement. The gears 20 and 21 maintain engagement with gears 19 and 22 respectively for approximately one-half their width when the shaft 18 is moved to the left in the manner stated.

In order to more accurately position the various elements of the device, the cover 4 may be provided with an eccentric at one edge and a pivotal connection at a diametrically opposed edge with the housing 1 so that the entire cover plate 4 may be moved a very small distance in either direction and thereby insure proper contact between the locating cams and the star wheel.

From the description given hereinabove, it will be apparent to those skilled in the art that an intermittent movement has been provided capable of intermittently advancing film varying increments of length by simply changing the position of a clutch rod. Moreover, the device as described is extremely sturdy, the only reciprocating part being the clutch rod. The entire chamber between the end plate 2 and the partition 3 may be filled with oil, thereby producing a substantially noiseless device. When an intermittent movement of this character is installed in a projector, the film may be moved longitudinally a distance of one frame at a time or two frames at a time, depending upon the character of film. As a result, the same projector may be used for projecting the ordinary monochromatic films or color films which require the projection of two or three images practically simultaneously.

It is to be understood that although a specific embodiment of the invention has been described in considerable detail, changes and modifications may be made in the construction without departing from the spirit of the invention. All such changes and modifications as come within the scope of the appended claims are embraced thereby.

I claim:

1. In an intermittent movement adapted to selectively longitudinally advance film varying longitudinal increments, the combination of: a continuously driven drive shaft; a driven shaft provided with a sprocket adapted to engage with film perforations; a cylindrical cam provided with a plurality of grooves of different form; means operably connecting said drive shaft and cylindrical cam for rotating said cam; a clutch portion mounted on said driven shaft and a slidably carried complementary clutch portion on said drive shaft; and adjustably positionable means selectively engageable with one of the grooves of said cylindrical cam for actuating the clutch portion carried by the drive shaft.

2. An intermittent movement of the character described in claim 1, including rotatable means for preventing rotation of the driven shaft when the clutch portions are disengaged.

3. An intermittent movement of the character described in claim 1, in which the means for actuating the clutch comprise a clutch rod provided with dogs adapted to be selectively introduced into grooves of said cylindrical cam and with an arm adapted to actuate said slidable clutch portion.

4. In an intermittent movement adapted to selectively longitudinally advance film varying longitudinal increments, the combination of: a continuously driven drive shaft; a driven shaft provided with a sprocket adapted to engage with film perforations; a cylindrical cam provided with a plurality of grooves of differing form adapted to impart different movements to elements in engagement therewith; means operably connecting said drive shaft and cylindrical cam for rotating said cam; a clutch portion mounted on said driven shaft and a slidably carried complementary clutch portion on said drive shaft; adjustably positionable means adapted to be selectively placed in engagement with one of the grooves of said cylindrical cam for actuating the clutch portion carried by the drive shaft; a star wheel mounted on said driven shaft and a locating cam in engagement with said star wheel for preventing rotation of the driven shaft when the clutch portions are disengaged.

5. An intermittent movement of the character described in claim 4 in which the means for actuating said clutch include a clutch rod provided with dogs adapted to be selectively introduced into grooves of said cylindrical cam and with an arm adapted to actuate said slidable wedge portion, and means for locking said clutch rod in desired position.

6. A device for intermittently advancing film in variable increments of length, including: a drive shaft; a driven shaft provided with a sprocket adapted to engage with film perforations; a cylindrical cam provided with a plurality of grooves, said cam being journaled on said drive shaft; means operably connecting said drive shaft and cylindrical cam for rotating said cam, said means including a countershaft and gearing adapted to drive said cam at a fractional speed of said drive shaft; a clutch adapted to operatively engage the drive shaft with the driven shaft; a clutch rod provided with dogs adapted to be selectively introduced into grooves of said cylindrical cam and with an arm adapted to actuate said clutch; a star wheel mounted on said driven shaft; and a plurality of spaced locating cams mounted on said countershaft in engageable position with said star wheel.

7. A device of the character described in claim 6, including means for simultaneously introducing a dog into a desired groove of said cylindrical cam and placing a correlated locating cam in engagement with said star wheel.

8. In a device for intermittently advancing film longitudinally, the combination of a continuously driven drive shaft; an intermittently driven shaft provided with a sprocket adapted to engage with film perforations; a clutch adapted to operatively engage said drive shaft with the driven shaft; and a selectively variable means operably connected with said drive shaft for operating said clutch at selectively different frequencies and for selectively different periods of engagement, said means including a plurality of continuously driven cams and adjustable means for selectively actuating the clutch by a desired cam.

9. In an intermittent movement, the combination of: a housing, a drive shaft extending into the housing; a driven shaft extending from the housing and provided with a sprocket adapted to engage with film perforations; a cylindrical cam provided with a plurality of grooves of differing form adapted to impart different movements to elements in engagement therewith; means operably connecting said drive shaft and cylindrical cam for rotating said cam within said housing; a clutch adapted to operably engage said drive shaft with the driven shaft; means selectively engageable with the grooves of said cylindrical cam for engaging and disengaging said clutch; and means for preventing rotation of said driven shaft when the clutch is disengaged.

10. In an intermittent movement, the combination of: a drive shaft; a driven shaft in alignment therewith, said driven shaft being provided with a sprocket adapted to engage with film perforations; a cylindrical cam; means operably connecting said drive shaft and cylindrical cam for rotating said cam; clutch members carried by opposing ends of the drive and driven shafts and adapted to operably connect said drive shaft with the driven shaft; means in engagement with said cylindrical cam for actuating one of said clutch members; and means including a star wheel on the driven shaft and a locating cam in engagement therewith for preventing rotation of said driven shaft when the clutch members are disengaged.

GABRIEL GARCÍA MORENO.